UNITED STATES PATENT OFFICE.

FRANK ORTH, OF INDIANA HARBOR, INDIANA.

BRICK AND PROCESS OF MAKING THE SAME.

1,363,264.　　　Specification of Letters Patent.　　Patented Dec. 28, 1920.

No Drawing. Application filed March 29, 1917, Serial No. 158,329. Renewed May 7, 1920. Serial No. 379,688.

*To all whom it may concern:*

Be it known that I, FRANK ORTH, a citizen of the United States, residing at Indiana Harbor, in the county of Lake and State of Indiana, have invented certain new and useful Improvements in Bricks and Processes of Making the Same, of which the following is a specification.

The present invention has to do with certain improvements in the manufacture of bricks and it has particular reference to the manufacture of silicia brick of high temperature resisting quality. In the manufacture of silica brick, the use of lime or similar material is detrimental, because, under the influence of high temperature, it combines with and fluxes the silica. Nevertheless, the use of lime or similar material as a binder for binding together the particles of silica is very desirable.

One of the objects of the present invention is to provide a brick and method of making the same in which the percentage of lime may be reduced to less than 5%, practically all of the remaining material being silica.

In general, it may be stated that the larger the particles of silica material the smaller the percentage of binding material necessary to hold the silica particles together. Furthermore, by graduating the sizes of the silica particles so as to reduce the percentage of voids, the percentage of binding material necessary may be still further reduced, while maintaining the solidity and homogeneity of the brick. Consequently another feature of my invention has to do with the use of relatively large particles or portions of silica material, grading the same down in such a manner as to reduce the percentage of voids, so that the binding material necessary to fill the voids may be correspondingly reduced.

I have discovered the fact that, if a brick formed of silica particles joined together by lime or similar binding material, be subjected to the influence of high pressure steam for a suitable period of time, the silica and lime will be caused to react in such a way as to produce a silica to calcium bond, probably in the form of calcium silicate. In this way, the binding or bonding action may be increased without increasing the percentage of lime, or conversely the percentage of lime may be reduced without reduction of the strength of the bonding action.

When it is desired to burn bricks in a kiln, it is quite necessary that they should be efficiently dried before being subjected to the high temperature existing within the kiln. Inasmuch as it is customary to mold the bricks in wet or damp condition, it follows that some form of drying step is necessary, and this usually means a considerable loss of time and expense. When, however, the bricks are subjected to the steaming treatment previously mentioned, they will be thereby dried, so that they may be introduced into the kiln immediately after the steaming treatment.

In order that the features of my invention may be more readily and thoroughly understood, I will give one example of a process embodying the said features, but in giving such an example, I wish it to be distinctly understood that I do not thereby limit myself either to the steps of process or proportions mentioned, except as I may limit myself in the claims.

I first select an aggregate of silica material comprising particles of suitable size. These particles may range, for example, from the size of grains of sand up to a size which is suitable to pass a four mesh to the inch screen. Such an aggregate, for example, may consist of 15% of size to pass a 40–50 mesh screen; 15% to pass a 30–40 mesh screen; 15% to pass a 20–30 mesh screen; 15% to pass a 10–20 mesh screen; and 40% to pass a 4–10 mesh screen.

This silica material may comprise crushed silica rock running from 95–99% pure silica. The rock so crushed may be graded in order to give the desired sizing, such, for example, the sizing above mentioned.

Having selected the material for the aggregate, the lime is to be mixed therewith. This lime may be conveniently prepared by calcining and hydrating in the usual way. The lime thus prepared may be used either dry or in pasty condition. 2 to 4% of the lime is to be mixed with the aggregate, and such mixing may be done in any convenient manner as by means of a grinding pan or a pug mill. The mixture thus prepared is molded into the shapes, preferably by the use of a molding machine, capable of exerting a pressure of 2500–5000 pounds per brick of standard size ($9'' \times 4\frac{1}{2}'' \times 2\frac{1}{2}''$). Other shapes and sizes should be molded in substantially the same ratio.

The brick thus molded are conveniently piled or stacked into cars or trucks, and then sent to a steam cylinder where they may be subjected to a pressure of approximately 125 pounds per square inch for ten hours. This will create a silica to calcium bond, probably in the form of calcium silicate. In order to get thoroughly satisfactory results, the lime should be "live"—that is, it should be calcined and hydrated only a short time before being used, as it has been found that if an interval of a number of days intervene between the preparation of the lime and the steaming process that it is not possible to secure as satisfactory results as can be secured when the lime is perfectly fresh. The steam may be saturated steam coming directly from the boiler.

The brick thus steamed is finished as an unburned brick. For many classes of service, the unburned brick thus produced will be found even more satisfactory than the burned brick. If, however, it is desired to burn the brick, the car or truck may be run from the steam cylinder direct to the kiln and the brick may then be stacked or piled into the kiln. Then they will be burned in the usual way at a temperature of 2800–3000° F. for a period of approximately eight days. I have previously mentioned the treatment of the raw brick in the steam cylinder serves to practically dry the same, so that it can be sent directly to the kiln for burning without any intermediate drying step.

The unburned brick thus produced is very satisfactory for use in hot patch work, for example, in open hearth furnace practice. In practising this work, the brick is subjected directly to a very high temperature, and experience has shown that the raw and unburned brick will not splinter or crack when subjected to this treatment. On the other hand, the burned brick will ordinarily be found to be most satisfactory for use in the original construction of such furnaces.
When the brick are to be used raw or unburned, they should contain a slightly larger percentage of lime than when they are to be burned.

Satisfactory analysis of silicia rock or ganister rock for this class of work is as follows:

| | |
|---|---|
| Moisture | .03% |
| Silica | 97.98% |
| Alumina | .51% |
| Ferric oxid | .98% |
| Lime | .14% |
| Magnesia | .10% |
| Sulfur trioxid | .13% |
| Soda | .10% |
| Potash | .03% |

In many cases, satisfactory brick may be made up by using substantially the same steps of process as herein-explained by the use of silicia sand instead of an aggregate made up of particles of graduated sizes. In such case a satisfactory analysis of the sand would be as follows:

| | |
|---|---|
| Silica | 94.15% |
| Ferric and alumina oxid | 4.47% |
| Lime | 1.07% |
| Magnesia | .31% |

While I have above mentioned only certain particular examples of steps of process and compositions of materials, I desire to point out the fact that the elimination of a special drying step in the preparation of the brick for the kiln is a very important and desirable result, because a large amount of space is necessary for the accommodation of the brick during any drying stage. The elimination of the special drying step, therefore, will largely reduce the total amount of space necessary to carry on the manufacture of the completed product.

In the manufacture of the brick herein disclosed, the use of a molding machine is very desirable, because it is thus possible to eliminate the hand labor of this step in the process, and also because the high pressure to which the brick may thus be subjected will very greatly improve the quality of the finished product.

While I have above mentioned only certain particular examples of steps of process and compositions of materials, still it will be understood that I do not limit myself to these exact steps nor percentages, except as I may limit myself in the claims.
I claim:

1. The process for the manufacture of building material, which consists in first preparing an aggregate comprising particles of substantially pure silica material in sizes graduated from those of relatively large size to those which will pass a forty mesh screen and of such proportions as to secure a minimum percentage of voids, then mixing therewith 2–5% of calcined and hydrated lime, then molding said mixture into the desired shape, then subjecting the material so molded to the action of steam at substantially one hundred twenty-five pounds per square inch for approximately ten hours, and directly thereafter burning the same for a period of substantially eight days at a temperature of 2800–3000° F.

2. The process for the manufacture of building material, which consists in first preparing an aggregate comprising particles of substantially pure silica material in sizes graduated from those of relatively large size to those which will pass a forty mesh screen and of such proportions as to secure a minimum percentage of voids, then mixing therewith 2–5% of calcined and hydrated lime, then molding said mixture into the desired shape, then subjecting the material so molded to the action of steam at substantially one hundred twenty-five pounds per square inch for approximately ten hours.

3. The process for the manufacture of building material, which consists in first preparing an aggregate comprising particles of substantially pure silica material in sizes so graduated as to give a minimum percentage of voids, then mixing therewith 2-5% of calcined and hydrated lime, then molding said mixture into the desired shape, then subjecting the material so graduated to the action of steam at substantially one hundred twenty-five pounds per square inch for approximately ten hours.

4. The process for the manufacture of building material which consists in first preparing an aggregate comprising particles of silica material of graduated sizes for the purpose of giving a minimum percentage of voids, then mixing therewith 2-5% of calcined and hydrated lime, then molding said mixture into the desired shape, then subjecting the material so molded to the action of high pressure steam for the purpose specified, and directly thereafter burning the material at a high temperature.

5. The process for the manufacture of building material which consists in first preparing an aggregate comprising particles of silica material of graduated sizes for the purpose of giving a minimum percentage of voids, then mixing therewith 2-5% of calcined and hydrated lime, then molding said mixture into the desired shape, and then subjecting the material so molded to the action of high pressure steam for the purpose specified.

6. The process for the manufacture of building material of extremely high refractory quality, which consists in first preparing an aggregate of substantially pure silica material having particles of graduated sizes for the purpose specified, thereafter mixing therewith not to exceed 5% of lime, thereafter subjecting the material to the action of high pressure steam for the purpose specified, and thereafter burning it at high temperature.

7. The process for the manufacture of building material of extremely high refractory quality, which consists in first preparing an aggregate of substantially pure silica material having particles of graduated sizes for the purpose specified, thereafter mixing therewith not to exceed 5% of lime, and thereafter subjecting the material to the action of high pressure steam for the purpose specified.

FRANK ORTH.